US012039634B2

(12) United States Patent
Vij

(10) Patent No.: US 12,039,634 B2
(45) Date of Patent: Jul. 16, 2024

(54) THREE-DIMENSIONAL VECTOR-BASED BRUSHES

(71) Applicant: Adobe Inc., San Jose, CA (US)

(72) Inventor: Rishabh Vij, Rohtak (IN)

(73) Assignee: Adobe Inc., San Jose, CA (US)

(*) Notice: Subject to any disclaimer, the term of this patent is extended or adjusted under 35 U.S.C. 154(b) by 270 days.

(21) Appl. No.: 17/739,340

(22) Filed: May 9, 2022

(65) Prior Publication Data

US 2023/0360283 A1 Nov. 9, 2023

(51) Int. Cl.
*G06T 11/00* (2006.01)
*G06T 11/60* (2006.01)

(52) U.S. Cl.
CPC ............ *G06T 11/001* (2013.01); *G06T 11/60* (2013.01)

(58) Field of Classification Search
CPC ....... G06T 11/001; G06T 11/60; G06T 11/203
See application file for complete search history.

(56) References Cited

U.S. PATENT DOCUMENTS

2016/0132498 A1* 5/2016 Wang ..................... G06T 7/90
382/165

OTHER PUBLICATIONS

Jain, Ajay, Gregg Wilensky, and Mohit Chandra. "Multi-Color Brush." International Journal 3.2 (2014). pp. 85-91 (Year: 2014).*

* cited by examiner

*Primary Examiner* — Said Broome
*Assistant Examiner* — Andrew Shin
(74) *Attorney, Agent, or Firm* — FIG. 1 Patents

(57) ABSTRACT

In implementations of three-dimensional vector-based brushes, a computing device implements a brush system to receive input data describing a first stamp and a second stamp of consecutive stamps of a vector-based digital brush. The first stamp is segmented into a first convex geometry and a second convex geometry, and the second stamp is segmented into a third convex geometry and a fourth convex geometry. The brush system computes a first convex hull of the first convex geometry and the third convex geometry and computes a second convex hull of the second convex geometry and the fourth convex geometry. An order for passing the first convex hull and the second convex hull to a planarizer is determined and the brush system generates a vector-based stroke of digital paint for display in a user interface based on the order.

20 Claims, 16 Drawing Sheets

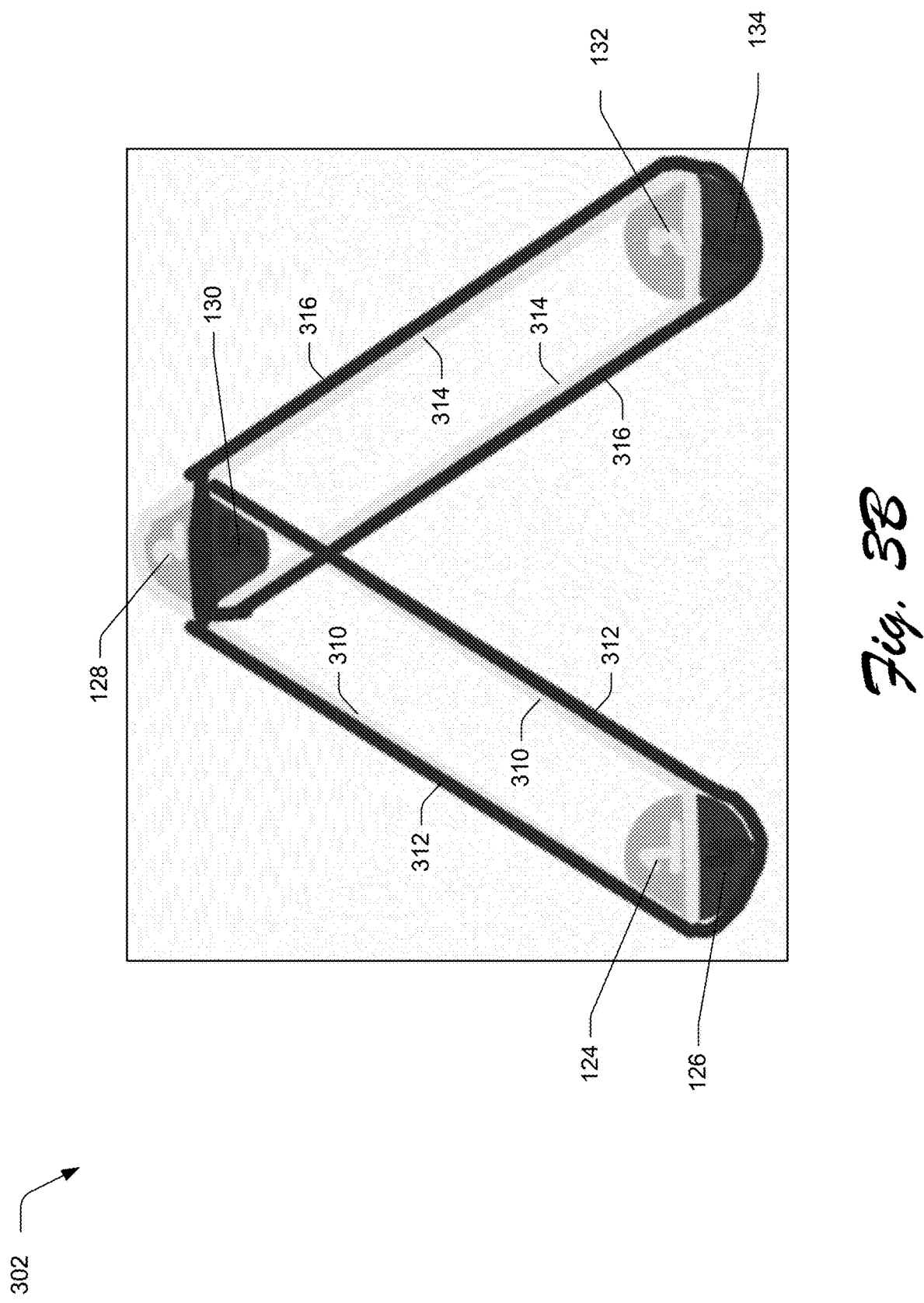

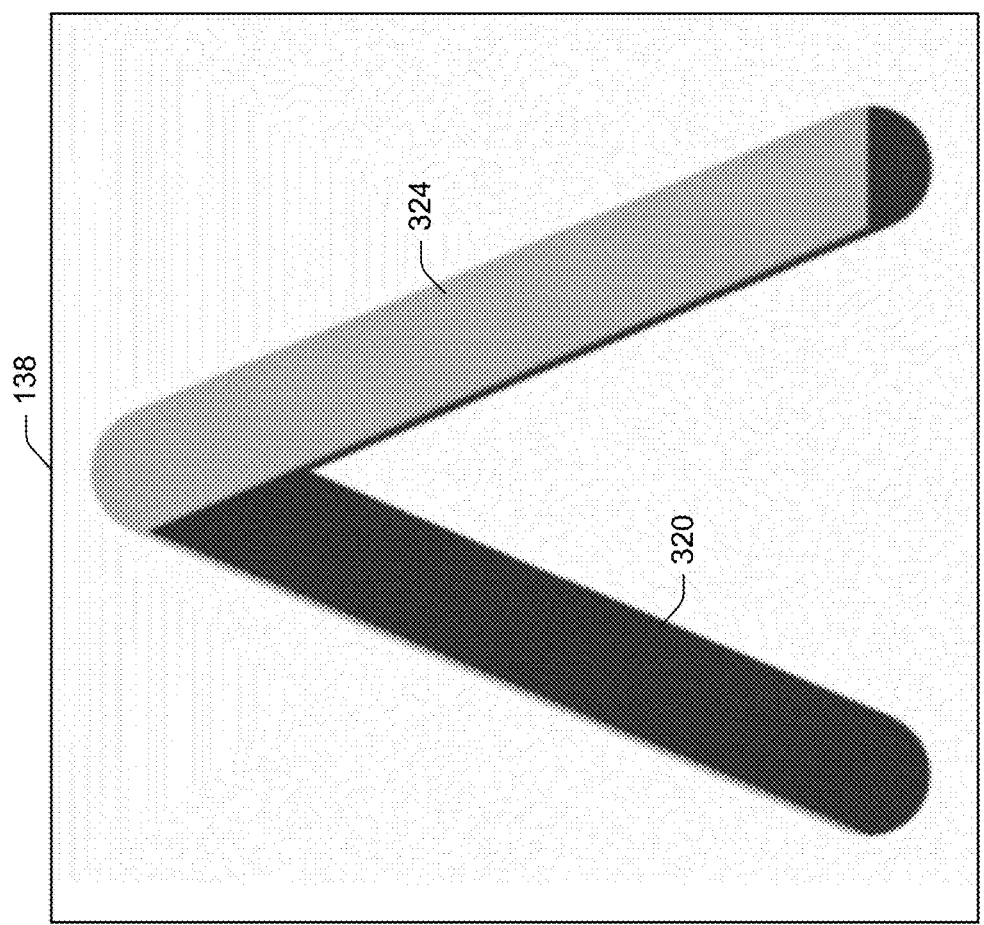

THREE-DIMENSIONAL VECTOR-BASED BRUSHES

BACKGROUND

Applications for digital painting and drawing often include multiple brushes which are selectable to change a visual appearance of strokes of digital paint drawn on a digital canvas. By interacting with an input device (e.g., a mouse, a stylus, a touchscreen, etc.) a user draws raster-based strokes of digital paint on the digital canvas using a raster-based brush or the user draws vector-based strokes of digital paint on the digital canvas using a vector-based brush. The raster-based strokes are defined by pixels which map directly to a stamp of the raster-based brush. The vector-based strokes are defined by mathematical equations which do not map directly to a stamp of the vector-based brush. Rather, the vector-based strokes are computed using geometric primitives which prevents vector-based brushes from creating complex visual effects that are creatable using raster-based brushes.

SUMMARY

Techniques and systems are described for implementing three-dimensional vector-based brushes. In one example, a computing device implements a brush system to receive input data describing a first stamp and a second stamp of consecutive stamps of a vector-based digital brush. The first stamp is segmented into first convex geometries and the second stamp is segmented into second convex geometries. The brush system computes a first convex hull of a convex geometry of the first convex geometries and a convex geometry of the second convex geometries.

For example, the brush system computes a second convex hull of an additional convex geometry of the first convex geometries and an additional convex geometry of the second convex geometries. A relative order is determined for passing the first convex hull and the second convex hull to a planarizer. The brush system generates a vector-based stroke of digital paint for display in a user interface based on the relative order. For instance, the stroke of digital paint has a three-dimensional appearance based on the relative order.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIGS. 3A, 3B, 3C, 3D, and 3E illustrate an example of a three-dimensional vector-based brush with two colors.

DETAILED DESCRIPTION

Overview

Figure 1:
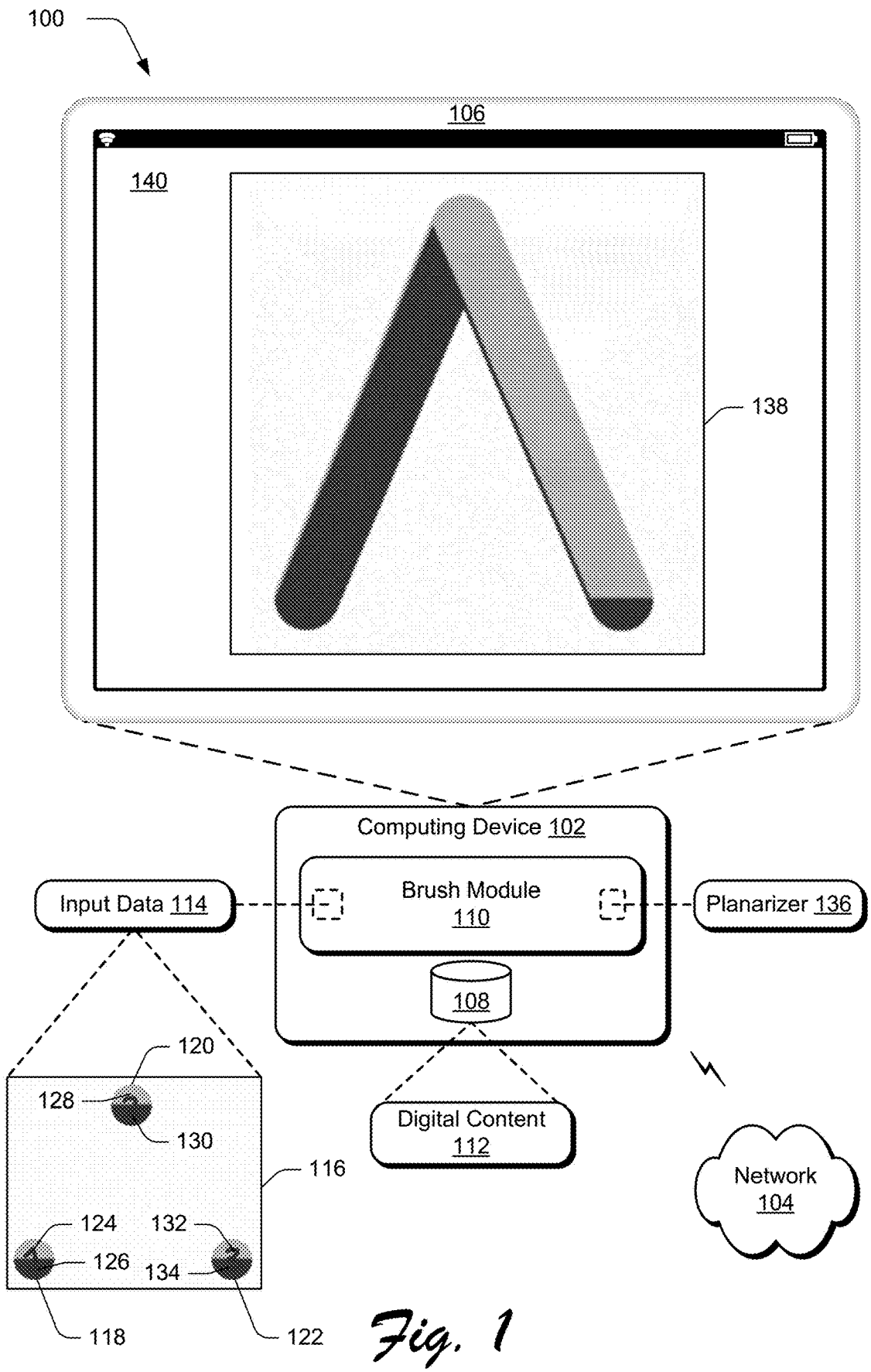
FIG. 1 is an illustration of an environment in an example implementation that is operable to employ digital systems and techniques as described herein.

Applications for digital sketching and painting include digital brushes which are selectable to change a visual appearance of strokes of digital paint sketched or painted on a digital canvas. By interacting with an input device (e.g., a touchscreen, a mouse, a stylus, etc.) a user sketches/paints raster-based strokes of digital paint on the digital canvas using a raster-based brush or the user sketches/paints vector-based strokes of digital paint on the digital canvas using a vector-based brush. The raster-based strokes are defined by pixels which map directly to a stamp of the raster-based brush. Because of this direct mapping, different stamps of raster-based brushes are usable to create complex visual features such as three-dimensional features.

The vector-based strokes are defined by mathematical equations which do not map directly to a stamp of the vector-based brush. Instead, the vector-based strokes are computed using geometric primitives. This prevents vector-based brushes of conventional systems from creating complex visual features such as the three-dimensional features that are creatable using raster-based brushes. In order to overcome the limitations of conventional systems, systems and techniques for implementing three-dimensional vector-based brushes are described.

In an example, a computing device implements a brush system to receive input data describing a first stamp and a second stamp of consecutive stamps of a vector-based digital brush. The first stamp is segmented into a first convex geometry and a second convex geometry, and the second stamp is segmented into a third convex geometry and a fourth convex geometry. For example, the first convex geometry and the third convex geometry each represent a first color and the second convex geometry and the fourth convex geometry each represent a second color.

The brush system computes a first convex hull of the first convex geometry and the third convex geometry, and the brush system computes a second convex hull of the second convex geometry and the fourth convex geometry. The brush system then determines an order for passing the first convex hull and the second convex hull to a planarizer. The planarizer unites convex hulls by tracking orders of regions of the convex hulls which represent different colors. For overlapping regions of multiple convex hulls representing different colors, the planarizer prioritizes a color represented by a last one of the multiple convex hulls passed to the planarizer.

For example, the first convex hull and the second convex hull collectively include three regions. The first region includes only the first convex hull and represents the first color. The second region includes only the second convex hull and represents the second color. For instance, the third region is an overlapping region and includes both the first convex hull and the second convex hull. In order to determine whether the third region represents the first color or the second color, the brush system leverages a direction from the first stamp to the second stamp.

To do so in one example, the brush system considers a hypothetical point in the direction which lies within the third region. The brush system simultaneously moves the first convex geometry and the second convex geometry of the first stamp towards the hypothetical point. If a portion of the first convex geometry passes through the hypothetical point after the second convex geometry has passed through the hypothetical point, then the brush system determines that the third region is the first color. In this scenario, the brush system passes the first convex hull to the planarizer after passing the second convex hull to the planarizer.

Alternatively, if a portion of the second convex geometry passes through the hypothetical point after the first convex geometry has passed through the hypothetical point, then the brush system determines that the third region is the second color. In this alternative scenario, the brush system passes the second convex hull to the planarizer after passing the first convex hull to the planarizer. A stroke of digital paint is generated for display in the user interface based on the order in which the first convex hull and the second convex hull are passed to the planarizer.

The stroke of digital paint has a three-dimensional appearance based on the first and second colors and is also a vector object which is scalable without aliasing and compactly representable. This functionality is not possible in conventional systems which are not capable of rendering three-dimensional vector-based objects in substantially real time as the objects are sketched/painted in the user interface. Moreover, the described systems for three-dimensional vector-based brushes are not limited to two colors and are capable of generating three-dimensional objects with any number of different colors and/or patterns which retain the desirable properties of vector-based objects. For instance, colors of a three-dimensional vector-based brush are selectable such that strokes of digital paint sketched/painted with the brush appear shaded. An order for passing convex hulls representing colors of the three-dimensional brush is specifiable such that the strokes of digital paint appear directionally shaded based on a light source or multiple light sources. The order for passing convex hulls representing colors of the three-dimensional vector-based brush is determinable based data received from the input device such as data describing velocity, pressure, etc.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and a brush module 110. The storage device 108 is illustrated to include digital content 112 such as digital images, graphic artwork, digital videos, etc. In some examples, the digital content 112 includes applications for creating digital content such as applications for digital drawing and/or painting which are also available to the brush module 110 and the computing device 102 via the network 104.

The brush module 110 is illustrated as having, receiving, and/or transmitting input data 114. As shown, the input data 114 describes consecutive stamps 116 of a vector-based digital brush including a first stamp 118, a second stamp 120, and a third stamp 122. In one example, the input data 114 describes timestamps corresponding to each of the stamps 118, 120, 122 which define an order of the consecutive stamps 116. In another example, the input data 114 describes a relative order of the consecutive stamps 116.

For example, the first stamp 118 is segmented into a first convex geometry 124 and a second convex geometry 126. In this example, the first stamp 118 has a circular shape and the first and second convex geometries 124, 126 are semicircular shapes defined by splitting the circular shape of the first stamp 118 horizontally. For instance, the first convex geometry 124 represents a first color and the second convex geometry 126 represents a second color.

The second stamp 120 is segmented into a third convex geometry 128 and a fourth convex geometry 130. Like the first stamp 118, the second stamp 120 has a circular shape and the third and fourth convex geometries 128, 230 are semicircular shapes. For example, the third convex geometry 128 is identical to the first convex geometry 124 and the third convex geometry 128 also represents the first color. The fourth convex geometry 130 is identical to the second convex geometry 126, and the fourth convex geometry 130 represents the second color.

The third stamp 122 is segmented into a fifth convex geometry 132 and a sixth convex geometry 134 which are each semicircular shaped. In an example, the fifth convex geometry 132 represents the first color and the sixth convex geometry 134 represents the second color. In this example, the fifth convex geometry 132 is identical to the third convex geometry 128 and the sixth convex geometry 134 is identical to the fourth convex geometry 130.

The brush module 110 processes the input data 114 to compute convex hulls of pairs of the convex geometries 124-134 based on an order of the consecutive stamps 116 of the vector-based digital brush, a direction from the first stamp 118 to the second stamp 120, and a direction from the second stamp 120 to the third stamp 122. To do so in one example, the brush module 110 computes the convex hulls of pairs of the convex geometries 124-134 in a same manner in which the brush module 110 would compute convex hulls of pairs of the stamps 118-122. For example, the brush module 110 computes a first convex hull of the first convex geometry 124 and the third convex geometry 128. In this example, the brush module 110 also computes a second convex hull of the second convex geometry 126 and the fourth convex geometry 130.

The brush module 110 determines an order in which to pass the first convex hull and the second convex hull to a planarizer 136. The planarizer 136 unites convex hulls by tracking order of different colored regions of the convex hulls. For instance, when colored regions of the convex hulls overlap, the planarizer 136 prioritizes a most recent colored region passed to the planarizer 136 (e.g., the most recent colored region is a last colored region that is passed to the planarizer 136). Accordingly, if the brush module 110 passes the first convex hull to the planarizer 136 and then passes the second convex hull to the planarizer 136, then an overlapping region of the first convex hull and the second convex hull will have the second color. Alternatively, if the brush module 110 passes the second convex hull to the planarizer 136 and then passes the first convex hull to the planarizer 136, then the overlapping region of the first convex hull and the second convex hull will have the first color. Based on a direction from the first stamp 118 to the second stamp 120, the brush module 110 determines that the overlapping region of the first convex hull and the second convex hull is the second color.

The brush module 110 computes a third convex hull of the third convex geometry 128 and the fifth convex geometry 132 and also computes a fourth convex hull of the fourth convex geometry 130 and the sixth convex geometry 134. For example, the brush module 110 determines an order in which to pass the third convex hull and the fourth convex hull to the planarizer 136. In this example, if the brush module 110 passes the third convex hull to the planarizer 136 and then passes the fourth convex hull to the planarizer 136, then an overlapping region of the third convex hull and the fourth convex hull will have the second color. Similarly, if the brush module 110 passes the fourth convex hull to the planarizer 136 and then passes the third convex hull to the planarizer 136, then the overlapping region of the third convex hull and the fourth convex hull will have the first color. Based on a direction from the second stamp 120 to the third stamp 122, the brush module 110 determines that the overlapping region of the third convex hull and the fourth convex hull is the first color.

For example, the brush module 110 passes the four convex hulls to the planarizer 136 such that the first convex hull is passed first, the second convex hull is passed second, the fourth convex hull is passed third, and the third convex hull is passed fourth. The planarizer 136 determines an order of the overlapping regions which the brush module 110 leverages as part of rendering a three-dimensional vector object 138 which is displayed in a user interface 140 of the display device 106. As shown, a portion of the vector object 138 corresponding to the overlapping region of the first convex hull and the second convex hull has the second color. A portion of the vector object 138 corresponding to the overlapping region of the third convex hull and the fourth convex hull has the first color.

Figure 2:
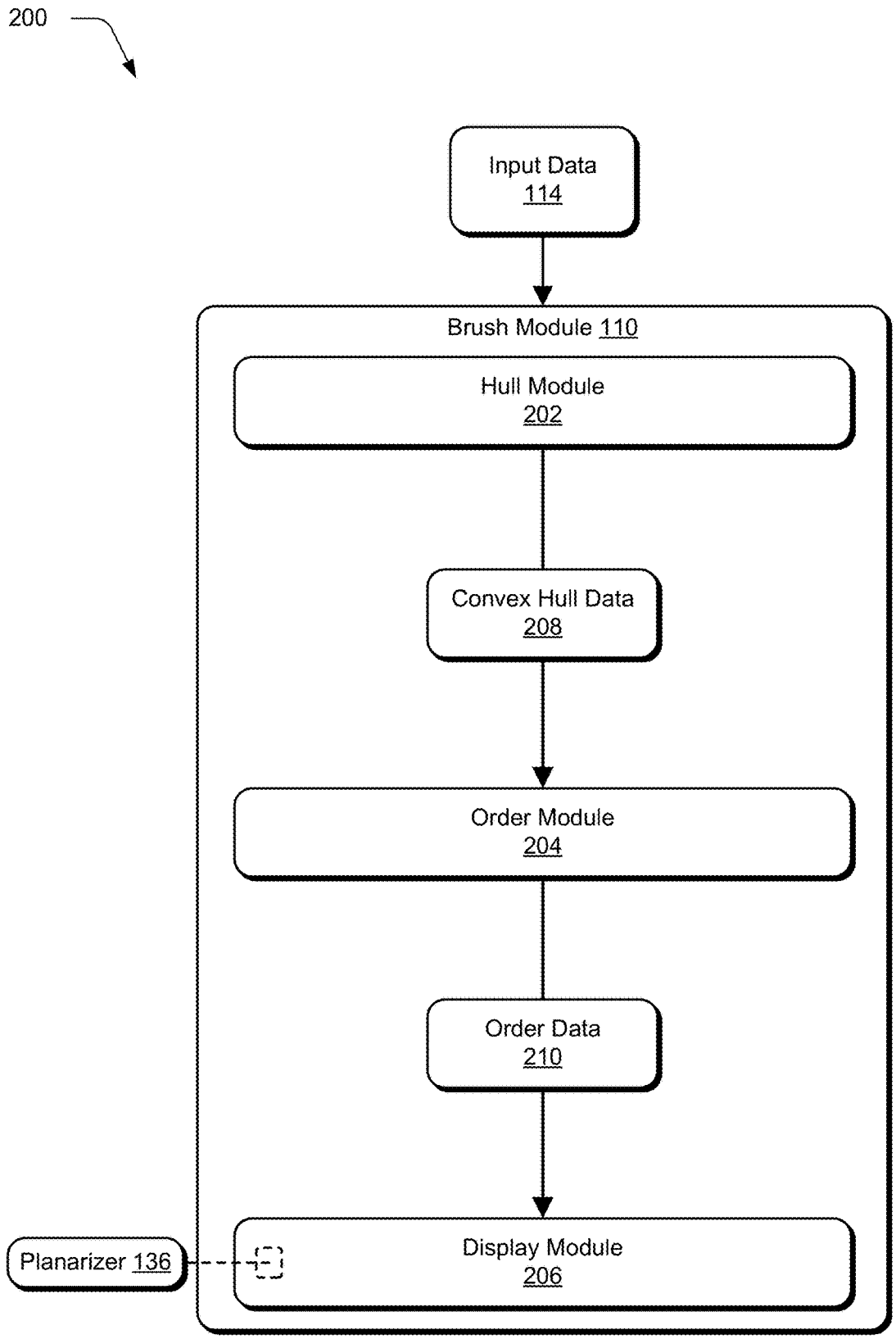
FIG. 2 depicts a system in an example implementation showing operation of a brush module for implementing three-dimensional vector-based brushes.

FIG. 2 depicts a system 200 in an example implementation showing operation of a brush module 110. The brush module 110 is illustrated to include a hull module 202, an order module 204, and a display module 206 and the brush module 110 receives the input data 114 as an input. For instance, the display module 206 is illustrated as having access to the planarizer 136. The hull module 202 receives the input data 114 and processes the input data 114 to generate convex hull data 208.

Figure 3A:
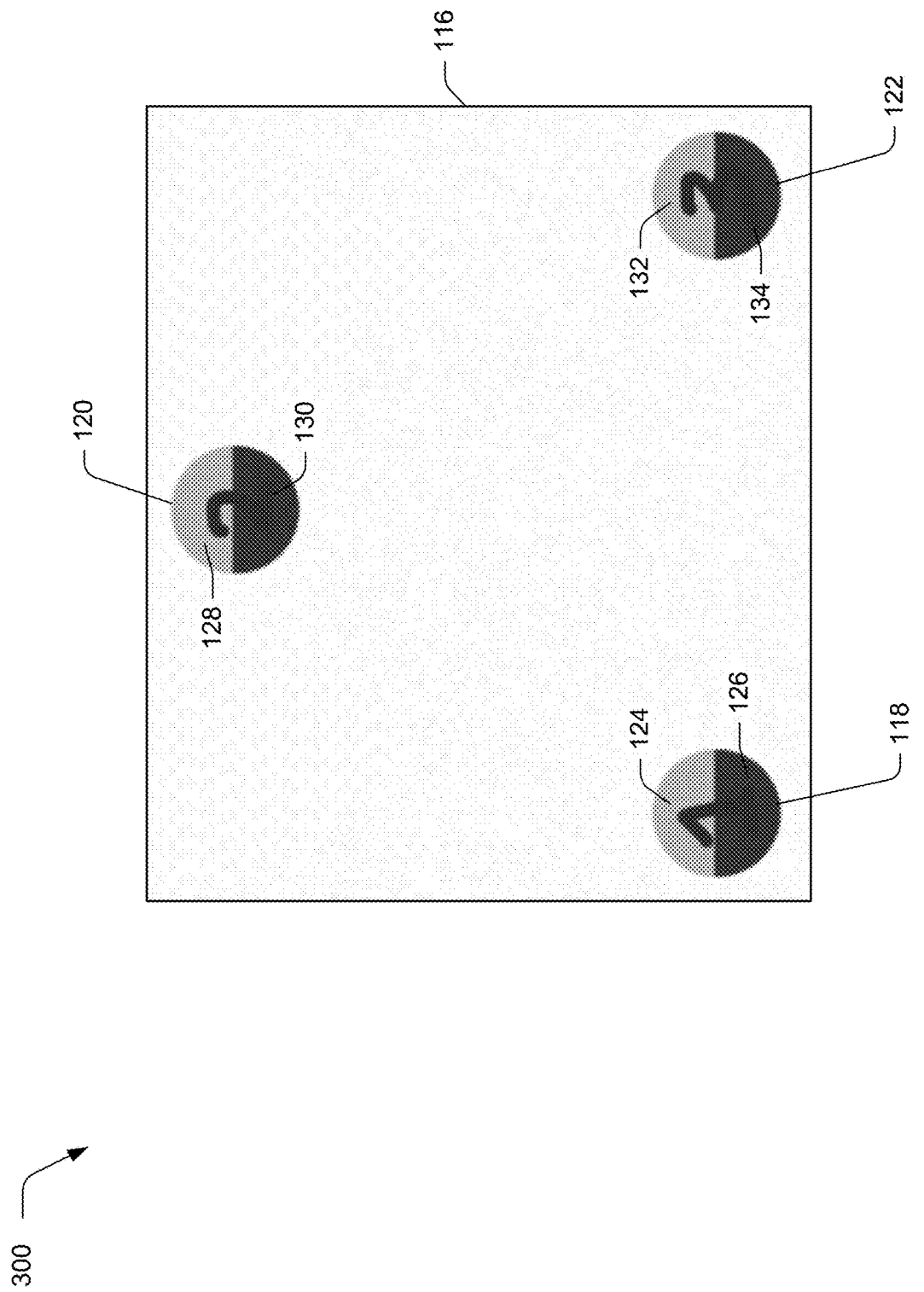
Figure 3C:
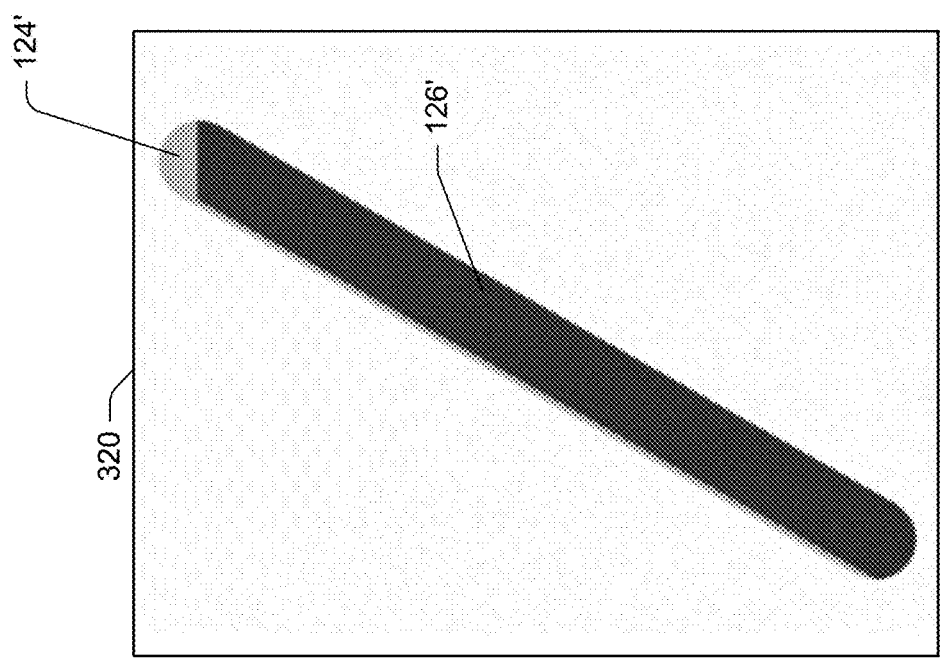
Figure 3C:
Figure 3C:
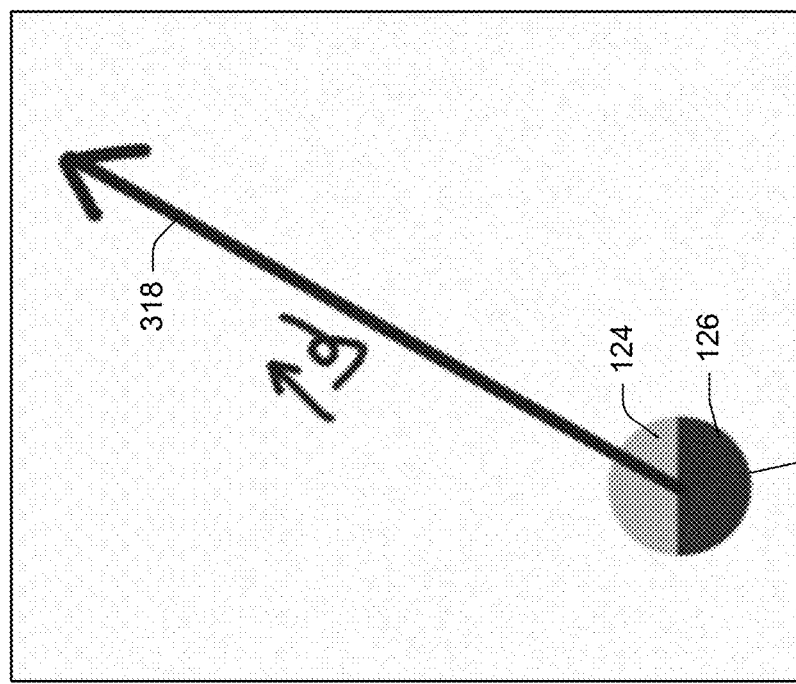
Figure 3D:
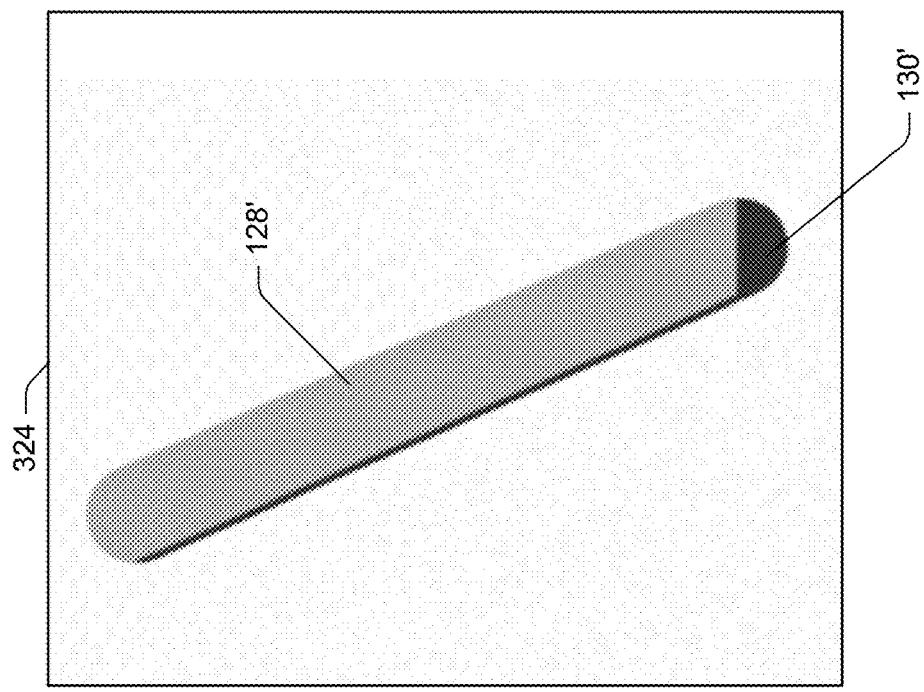
Figure 3D:
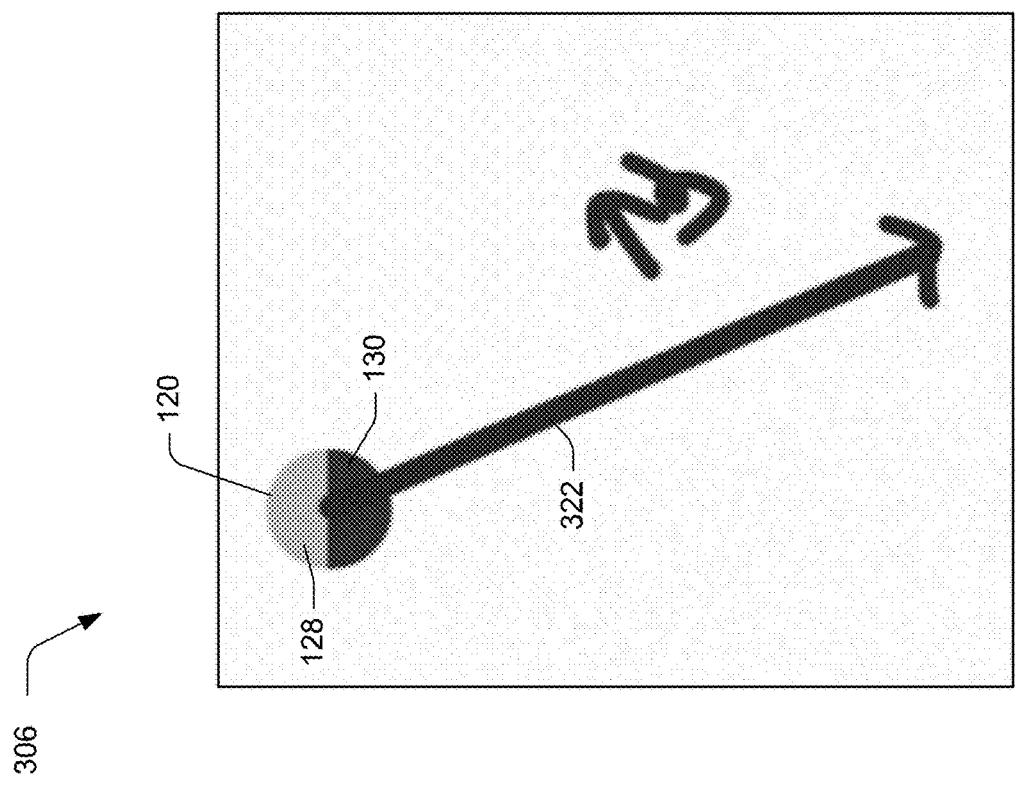

FIGS. 3A, 3B, 3C, 3D, and 3E illustrate an example of a three-dimensional vector-based brush with two colors. FIG. 3A illustrates a representation 300 of the input data 114. FIG. 3B illustrates a representation 302 of computing convex hulls of pairs of convex geometries. FIG. 3C illustrates a representation 304 of determining a color of an overlapping region based on a first direction. FIG. 3D illustrates a representation 306 of determining a color of an overlapping region based on a second direction. FIG. 3E illustrates a representation 308 of a three-dimensional vector object drawn/painted using a three-dimensional vector-based brush.

With reference to FIG. 2 and FIG. 3A, the hull module 202 receives the input data 114 which describes consecutive stamps 116 of a vector-based digital brush and includes a first stamp 118, a second stamp 120, and a third stamp 122. As shown, the first stamp 118 is segmented into a first convex geometry 124 and a second convex geometry 126; the second stamp 120 is segmented into a third convex geometry 128 and a fourth convex geometry 130; and the third stamp 122 is segmented into a fifth convex geometry 132 and a sixth convex geometry 134. For example, a number of the first convex geometry 124 and the second convex geometry 126 is equal to a number of the third convex geometry 128 and the fourth convex geometry 130 which is also equal to a number of the fifth convex geometry 132 and the sixth convex geometry 134. The hull module 202 processes the input data 114 to compute convex hulls for pairs of the convex geometries 124-134.

With reference to FIG. 3B, the hull module 202 computes a first convex hull 310 of the first convex geometry 124 and the third convex geometry 128 which both represent a first color. For example, the hull module 202 computes a second convex hull 312 of the second convex geometry 126 and the fourth convex geometry 130 which both represent a second color. The hull module 202 computes a third convex hull 314 of the third convex geometry 128 and the fifth convex geometry 132 which both represent the first color. Finally, the hull module 202 computes a fourth convex hull 316 of the fourth convex geometry 130 and the sixth convex geometry 134 which both represent the second color.

The hull module 202 generates the convex hull data 208 as describing the convex hulls 312-316. For example, the order module 204 receives and processes the convex hull data 208 to generate order data 210. To do so in one example, the order module 204 processes the convex hull data 208 to determine an order for passing the convex hulls 312-316 to the planarizer 136.

Planarizer Output

For two geometries that each represent a different color, the planarizer 136 generates different outputs in three different scenarios. In a first scenario, the two geometries do not overlap. In this first scenario, the planarizer 136 simplifies the two geometries and outputs simplified geometries that each retain the corresponding different color represented by the geometries upon input to the planarizer 136. In a second scenario, the two geometries completely overlap and both geometries are identical. In this second scenario, the planarizer 136 outputs one overlapping region having a color represented by the last of the two geometries passed to the planarizer 136. In a third scenario, the two geometries partially overlap. In this third scenario, portions of the two geometries that are not overlapping retain the corresponding color represented by the geometries upon input to the planarizer 136. The planarizer outputs the overlapping region as having a color represented by the last of the two geometries passed to the planarizer 136.

With reference to FIGS. 3C and 3D, the order module 204 leverages a direction 318 from the first stamp 118 to the second stamp 120 to determine an order for passing the first convex hull 310 and the second convex hull 312 to the planarizer 136. For example, the order module 204 identifies that as the first convex geometry 124 and the second convex geometry 126 simultaneously move or actuate in the direction 318, the first convex geometry 124 leads the second convex geometry 126 and the second convex geometry 126 lags the first convex geometry 124. Because of this, a hypothetical point between the first stamp 118 and the second stamp 120 will be passed by the first convex geometry 124 before being passed by the second convex geometry 126 as the first and second convex geometries 124, 126 simultaneously move or actuate in the direction 318. For example, the order module 204 determines that the first convex hull 310 is passed to the planarizer 136 before the second convex hull 312.

In one example, the order module 204 determines a partial vector object 320 that includes a projected first convex geometry 124' in the direction 318 and a projected second convex geometry 126' in the direction 318. Because the second convex geometry 126 that represents the second color lags the first convex geometry 124 that represents the first color in the direction 318, the projected second convex geometry 126' covers the projected first convex geometry 124' in an overlapping region of the first convex hull 310 and the second convex hull 312. Accordingly, the overlapping region of the first convex hull 310 and the second convex hull 312 is the second color.

As shown in FIG. 3D, the order module 204 leverages a direction 322 from the second stamp 120 to the third stamp 122 to determine an order for passing the third convex hull 314 and the fourth convex hull 316 to the planarizer 136. In an example, the order module 204 identifies that as the third convex geometry 128 and the fourth convex geometry 130 simultaneously move or actuate in the direction 322, the third convex geometry 128 lags the fourth convex geometry 130 and the fourth convex geometry 130 leads the third convex geometry 128. For instance, a hypothetical point between the second stamp 120 and the third stamp 122 will be passed by the fourth convex geometry 130 before being passed by the third convex geometry 128 as the third and fourth convex geometries 128, 130 simultaneously move or actuate in the direction 322. Based on this, the order module 204 determines that the fourth convex hull 316 is passed to the planarizer 136 before the third convex hull 314.

In the illustrated example, the order module 204 determines a partial vector object 324 that includes a projected third convex geometry 128' in the direction 322 and a projected fourth convex geometry 130' in the direction 322. Since the third convex geometry 128 that represents the first color lags the fourth convex geometry 130 that represents the second color in the direction 322, the projected third convex geometry 128' covers the projected fourth convex geometry 130' in an overlapping region of the third convex hull 314 and the fourth convex hull 316. Thus, the overlapping region of the third convex hull 314 and the fourth convex hull 316 is the first color.

The order module 204 generates the order data 210 as describing an order in which to pass the convex hulls 312-316 to the planarizer 136 as follows: the first convex hull 310, the second convex hull 312, the fourth convex hull 316, and the third convex hull 314. For instance, the display module 206 receives and processes the order data 210 and passes the convex hulls 312-316 to the planarizer 136 in the order described by the order data 210. With reference to FIG. 3E, the planarizer 136 determines an order of the overlapping regions of the convex hulls 312-316 which the display module 206 leverages as part of generating a three-dimensional vector object 138 for display in the user interface 140 of the display device 106. As shown, display module 206 combines the partial vector object 320 and the partial vector object 324 as the three-dimensional vector object 138 which has a three-dimensional appearance and also has advantageous properties of a vector object such as being scalable without aliasing, compactly representable on the storage device 108, and so forth.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 4:
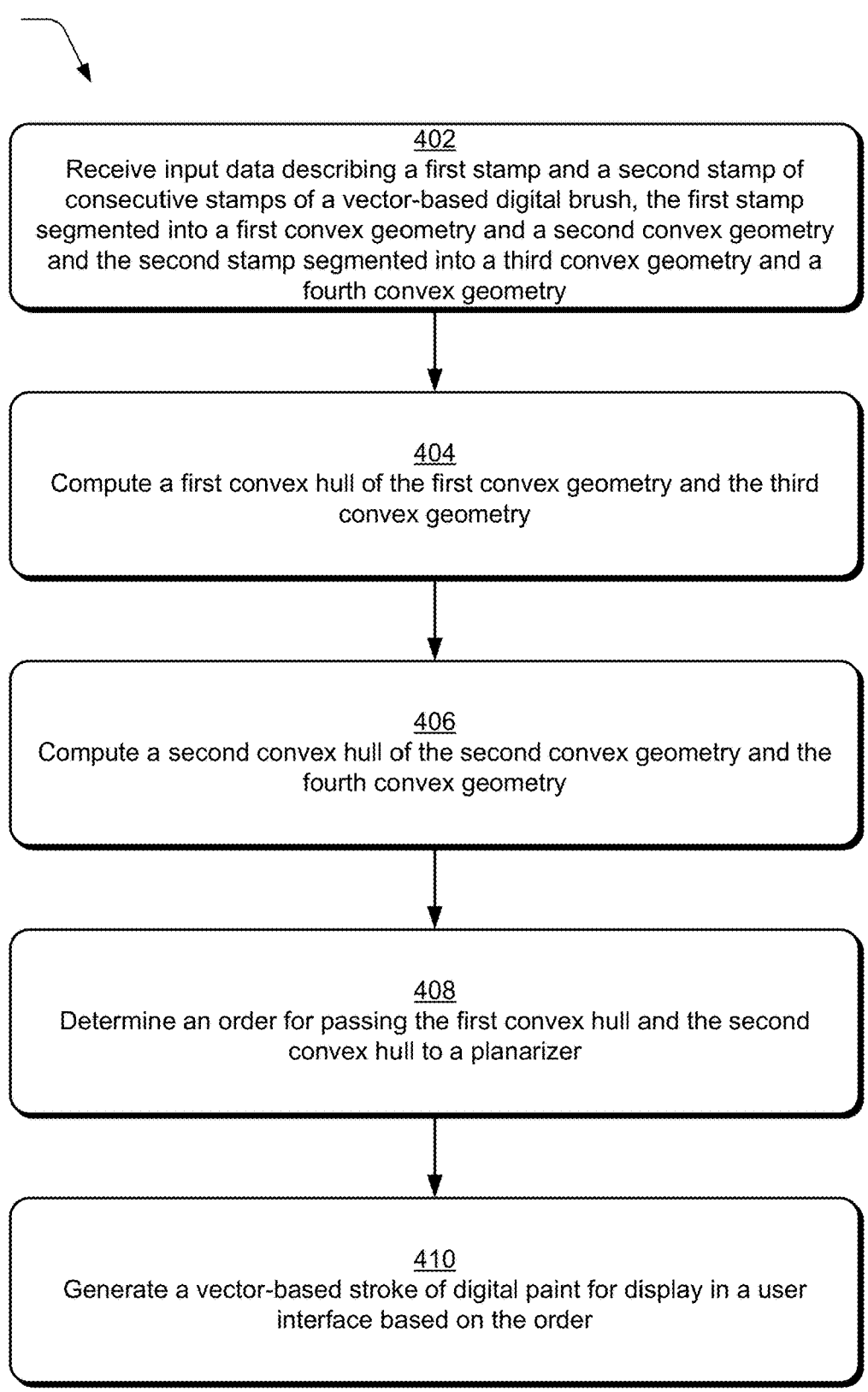
FIG. 4 is a flow diagram depicting a procedure in an example implementation in which input data describing a first stamp and a second stamp of consecutive stamps of a vector-based digital brush is received and a vector-based stroke of digital paint is generated for display in a user interface.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-3. FIG. 4 is a flow diagram depicting a procedure 400 in an example implementation in which input data describing a first stamp and a second stamp of consecutive stamps of a vector-based digital brush is received and a vector-based stroke of digital paint is generated for display in a user interface.

Input data is received describing a first stamp and a second stamp of consecutive stamps of a vector-based digital brush, the first stamp segmented into a first convex geometry and a second convex geometry and the second stamp segmented into a third convex geometry and a fourth convex geometry (block 402). For example, the computing device 102 implements the brush module 110 to receive the input data. A first convex hull is computed of the first convex geometry and the third convex geometry (block 404). The brush module 110 computes the first convex hull in an example.

A second convex hull is computed of the second convex geometry and the fourth convex geometry (block 406). In one example, the computing device 102 implements the brush module 110 to compute the second convex hull. An order for passing the first convex hull and the second convex hull to a planarizer is determined (block 408). In some examples, the brush module 110 determines the order for passing the first convex hull and the second convex hull to the planarizer. A vector-based stroke of digital paint is generated for display in a user interface based on the order (block 410). For example, the brush module 110 generates the vector-based stroke of digital paint for display in the user interface based on the order.

Figure 5:
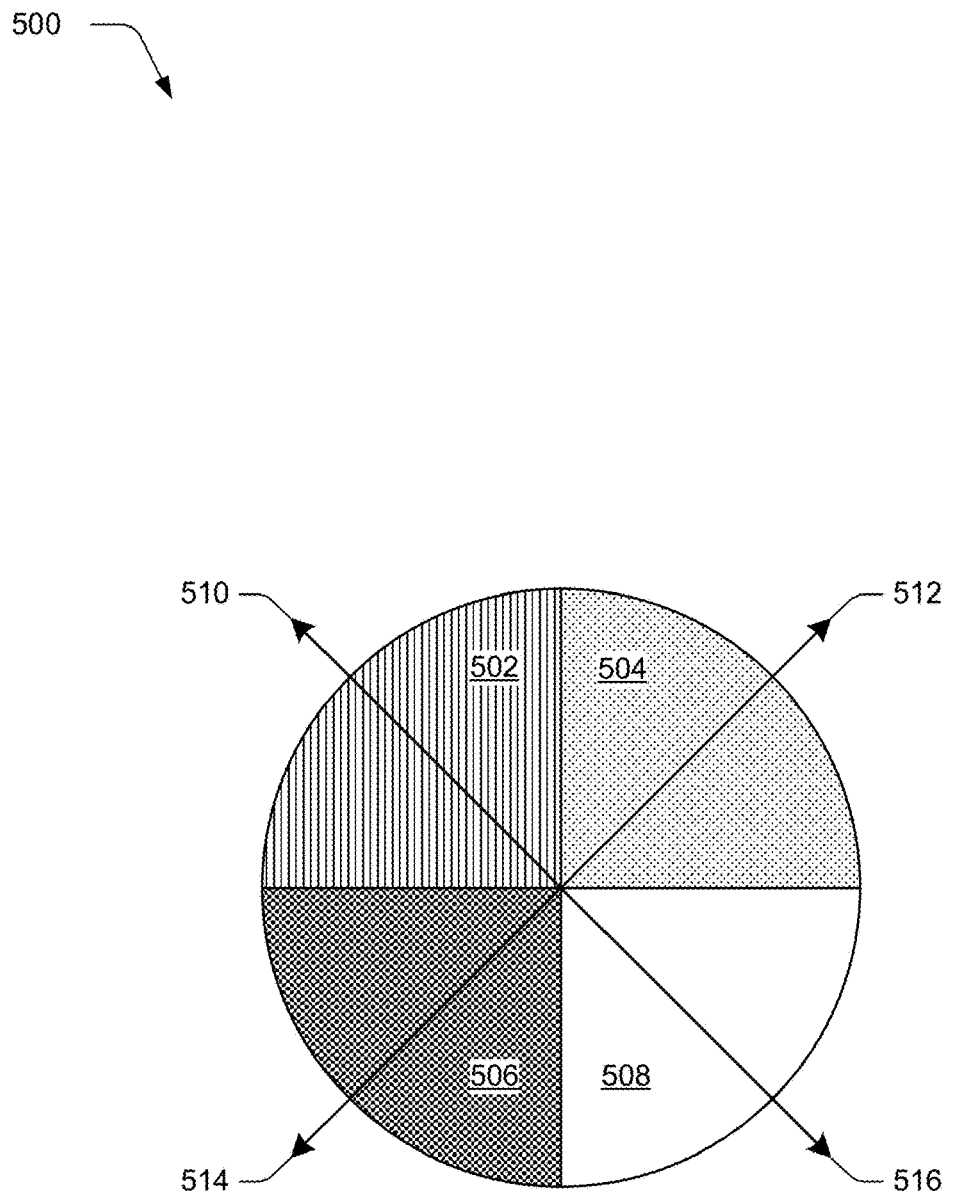
FIG. 5 illustrates a representation of determining an order to pass convex hulls to a planarizer based on directions.

FIG. 5 illustrates a representation 500 of determining an order to pass convex hulls to a planarizer based on directions. The representation 500 includes a stamp of a vector-based digital brush that is segmented into a first convex geometry 502, a second convex geometry 504, a third convex geometry 506, and a fourth convex geometry 508. For instance, the first convex geometry 502 represents a first color, the second convex geometry 504 represents a second color, the third convex geometry 506 represents a third color, and the fourth convex geometry 508 represents a fourth color.

The representation 500 also includes indications of directions 510-516. By projecting the convex geometries 502-508 in each of the directions 510-516, it is possible to determine an order of the first, second, third, and fourth colors in each of the directions 510-516 which corresponds to an order for passing a convex hull associated with each of the convex geometries 502-508 to the planarizer 136. For a first hypothetical point in the direction 510, the first convex geometry 502 and the first color pass the first hypothetical point first, the second convex geometry 504 and the second color pass the first hypothetical point second (or third), the third convex geometry 506 and the third color pass the first hypothetical point third (or second), and the fourth convex geometry 508 and the fourth color pass the first hypothetical point fourth. Accordingly, an order for passing convex hulls to the planarizer 136 for the direction 510 is a convex hull having the first convex geometry 502 first, a convex hull having the second convex geometry 504 second (or third), a convex hull having the third convex geometry 506 third (or second), and a convex hull having the fourth convex geometry 508 fourth.

For a second hypothetical point in the direction 512, the second convex geometry 504 and the second color pass the second hypothetical point first, the first convex geometry 502 and the first color pass the second hypothetical point second (or third), the fourth convex geometry 508 and the fourth color pass the second hypothetical point third (or second), and the third convex geometry 506 and the third color pass the second hypothetical point fourth. Thus, an order for passing convex hulls to the planarizer 136 for the direction 512 is the convex hull having the second convex geometry 504 first, the convex hull having the first convex geometry 502 second (or third), the convex hull having the fourth convex geometry 508 third (or second), and the convex hull having the third convex geometry 506 fourth.

Consider an example in which a third hypothetical point is in the direction 514. In this example, the third convex geometry 506 and the third color pass the third hypothetical point first, the fourth convex geometry 508 and the fourth color pass the third hypothetical point second (or third), the first convex geometry 502 and the first color pass the third hypothetical point third (or second), and the second convex geometry 504 and the second color pass the third hypothetical point fourth. Accordingly, an order for passing convex hulls to the planarizer 136 for the direction 514 is the convex hull having the third convex geometry 506 first, the convex hull having the fourth convex geometry 508 second (or third), the convex hull having the first convex geometry 502 third (or second), and the convex hull having the second convex geometry 504 fourth.

For a fourth hypothetical point in the direction 516, the fourth convex geometry 508 and the fourth color pass the fourth hypothetical point first, the third convex geometry 506 and the third color pass the fourth hypothetical point second (or third), the second convex geometry 504 and the second color pass the fourth hypothetical point third (or second), and the first convex geometry 502 and the first color pass the fourth hypothetical point fourth. Therefore, an order for passing convex hulls to the planarizer 136 for the direction 516 is the convex hull having the fourth convex geometry 508 first, the convex hull having the third convex geometry 506 second (or third), the convex hull having the second convex geometry 504 third (or second), and the convex hull having the first convex geometry 502 fourth.

Figure 6:
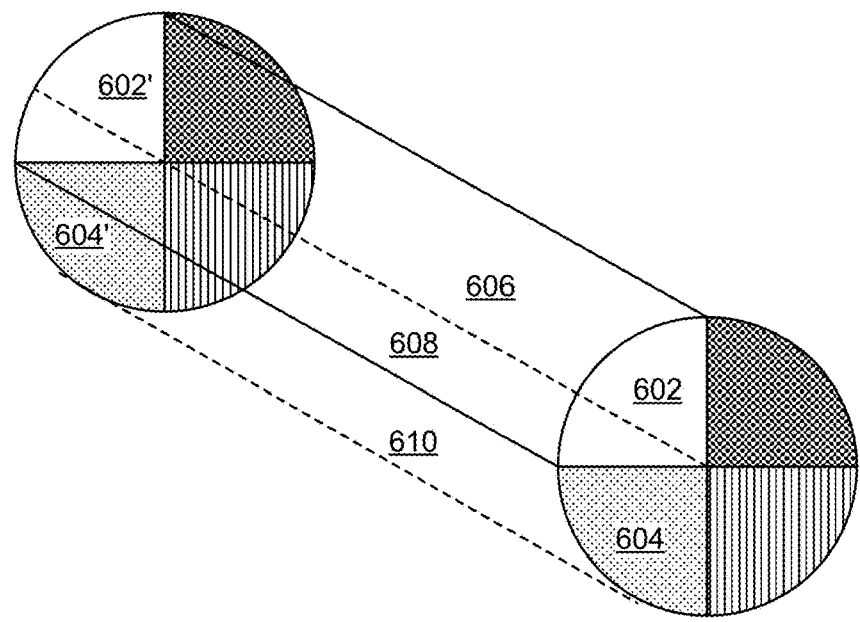
FIG. 6 illustrates a representation of determining colors for overlapping regions of convex hulls.

FIG. 6 illustrates a representation 600 of determining colors for overlapping regions of convex hulls. The representation 600 includes an illustration of two convex hulls. A first convex hull is of convex geometry 602 and convex geometry 602' and a second convex hull is of convex geometry 604 and convex geometry 604'. As shown, there are three regions 606-610 between the first convex hull and the second convex hull. Region 606 includes only the first convex hull and is a color represented by the convex geometries 602, 602'. Region 610 includes only the second convex hull and is a color represented by the convex geometries 604, 604'. Region 608 is an overlapping region of the first convex hull and the second convex hull. A color of the region 608 is dependent on a direction in some examples. For example, in a direction from 602 to 602', the region 608 is colored a color represented by the convex geometry 604 because the convex geometry 604 lags the convex geometry 602 in the direction from 602 to 602'. In a direction from 604' to 604, the region is colored a color represented by the convex geometry 602' because the convex geometry 602' lags the convex geometry 604' in the direction from 604' to 604.

Figure 7A:
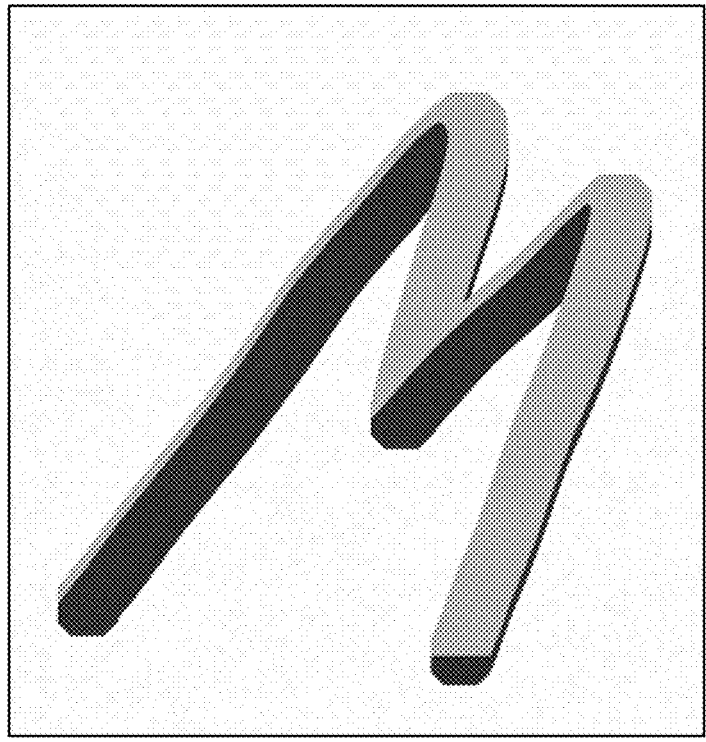
FIGS. 7A and 7B illustrate examples of objects sketched/painted using three-dimensional vector-based brushes.
Figure 7A:
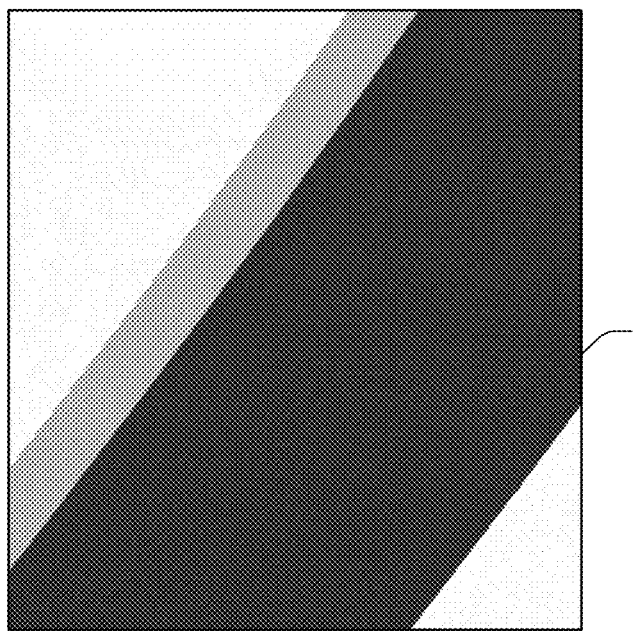
Figure 7B:
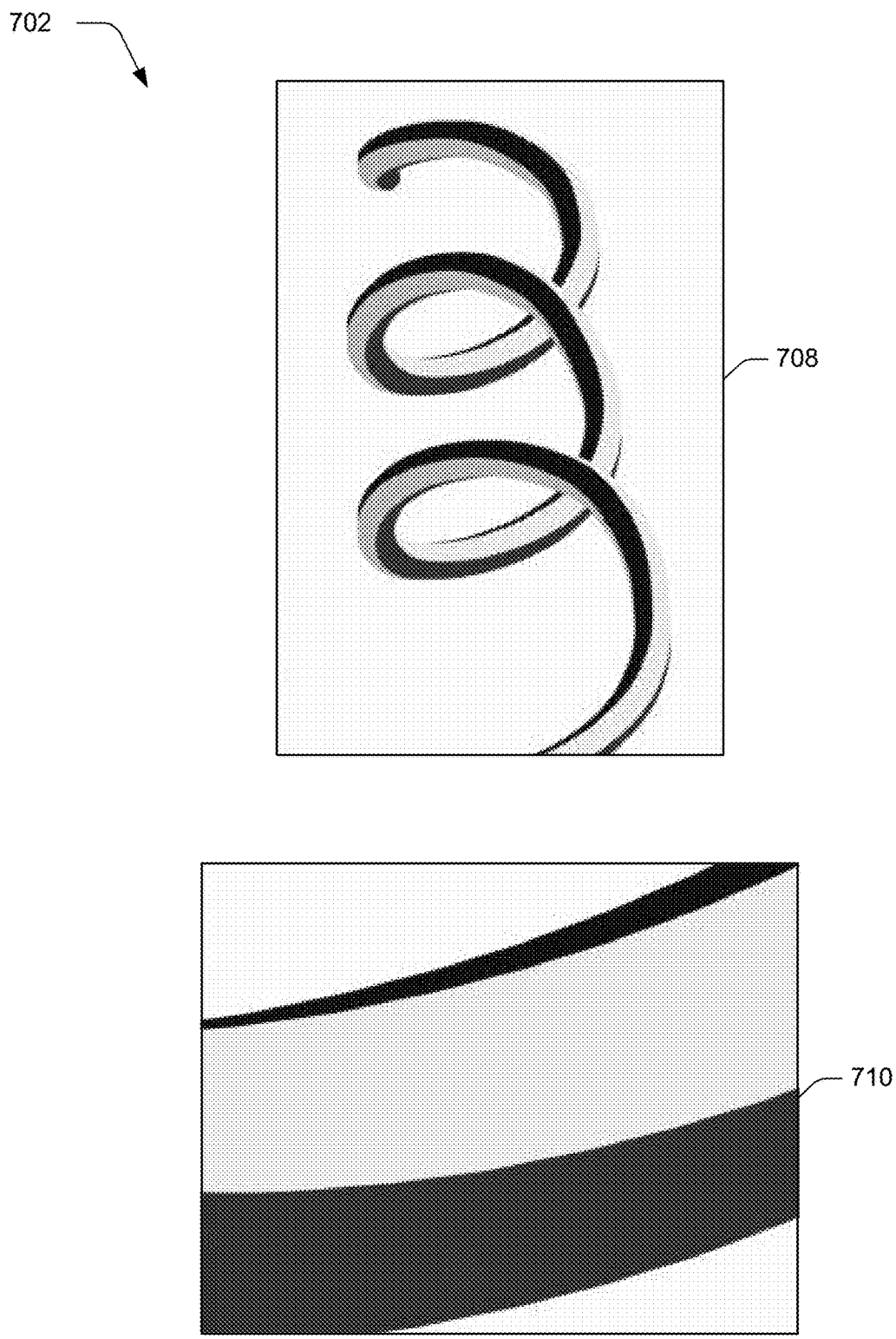

FIGS. 7A and 7B illustrate examples of objects sketched/painted using three-dimensional vector-based brushes. FIG. 7A illustrates a representation 700 of a vector object drawn/painted using a three-dimensional vector-based brush with two colors. FIG. 7B illustrates a representation 702 of a vector object drawn/painted using a three-dimensional vector-based brush with four colors.

As shown, the representation 700 includes a vector object 704 drawn/painted using the two-color, three-dimensional vector-based brush. The vector object 704 resembles a capital "M" and has a three-dimensional appearance. An enlarged portion 706 confirms that the vector object 704 is a vector graphic as the enlarged portion 706 scales the vector object 704 without aliasing.

The representation 702 includes a vector object 708 drawn/painted using the four-color, three-dimensional vector-based brush. As shown, the vector object 708 resembles a helix and has a three-dimensional appearance. An enlarged portion 710 confirms that the vector object 708 is a vector graphic as the enlarged portion 710 scales the vector object 708 without aliasing.

Figure 8A:
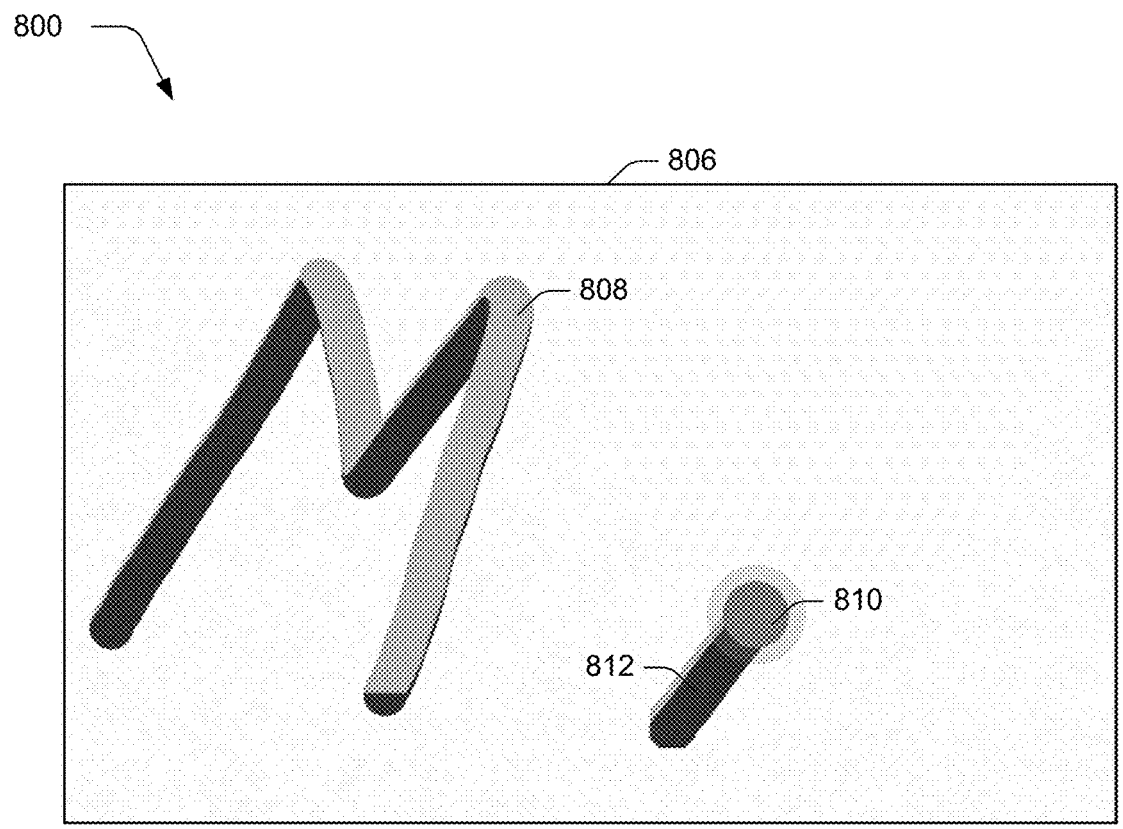
FIGS. 8A, 8B, and 8C illustrate representations of drawing/painting a three-dimensional vector object in substantially real time using a three-dimensional vector-based brush.
Figure 8A:
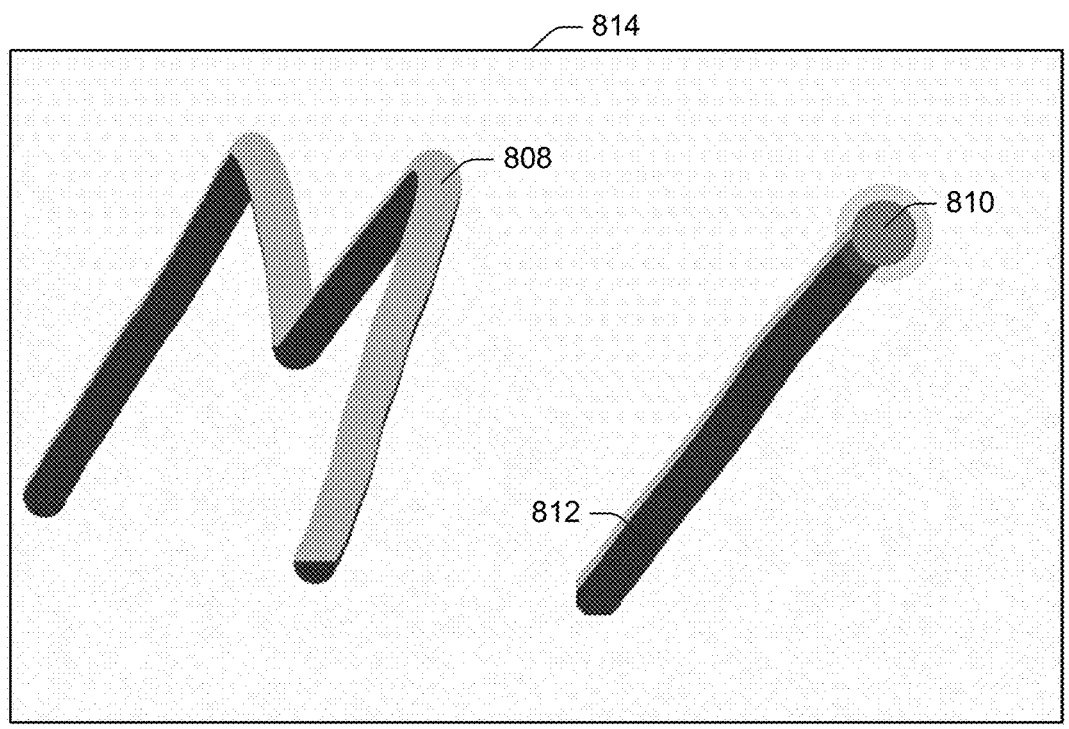
Figure 8B:
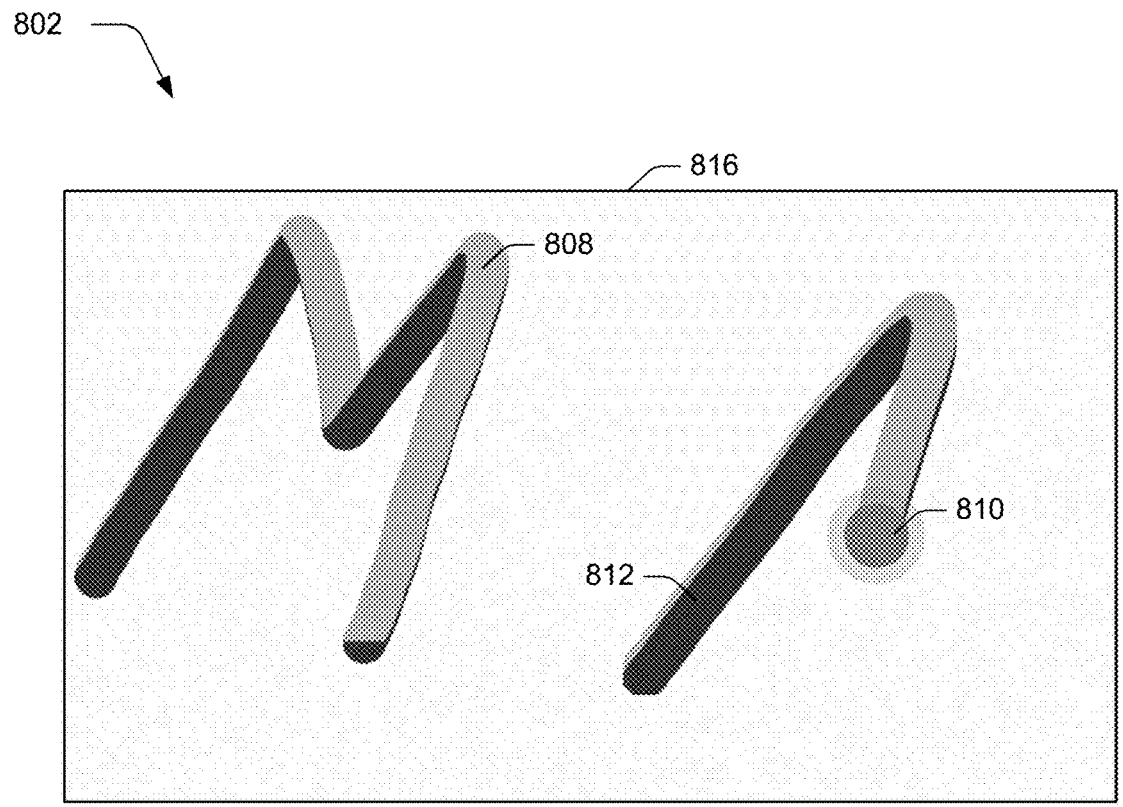
Figure 8B:
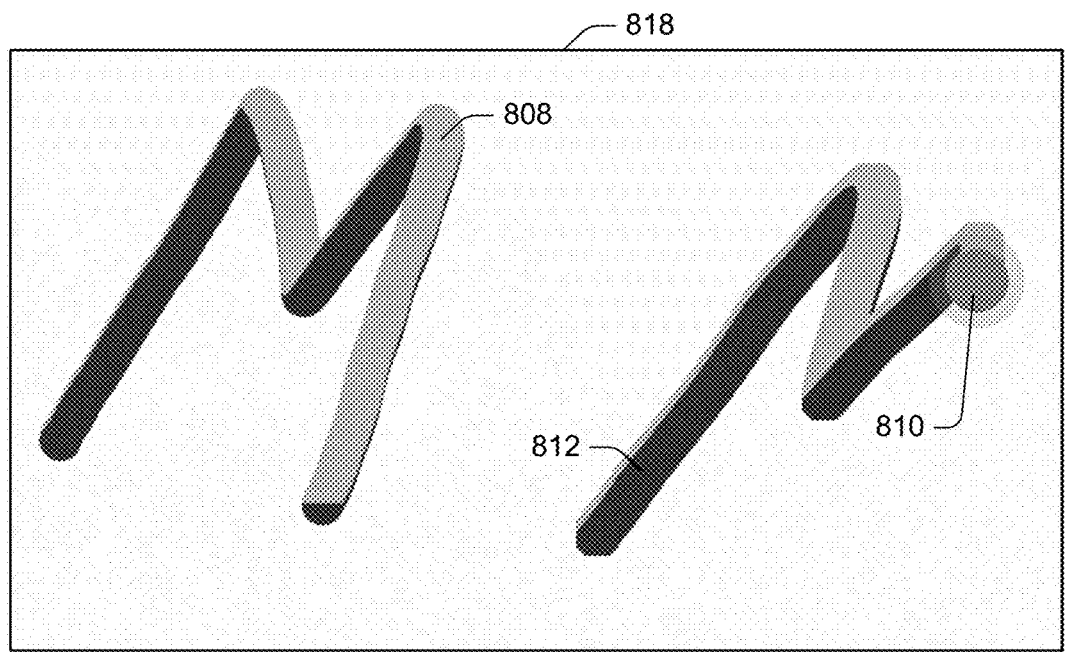
Figure 8C:
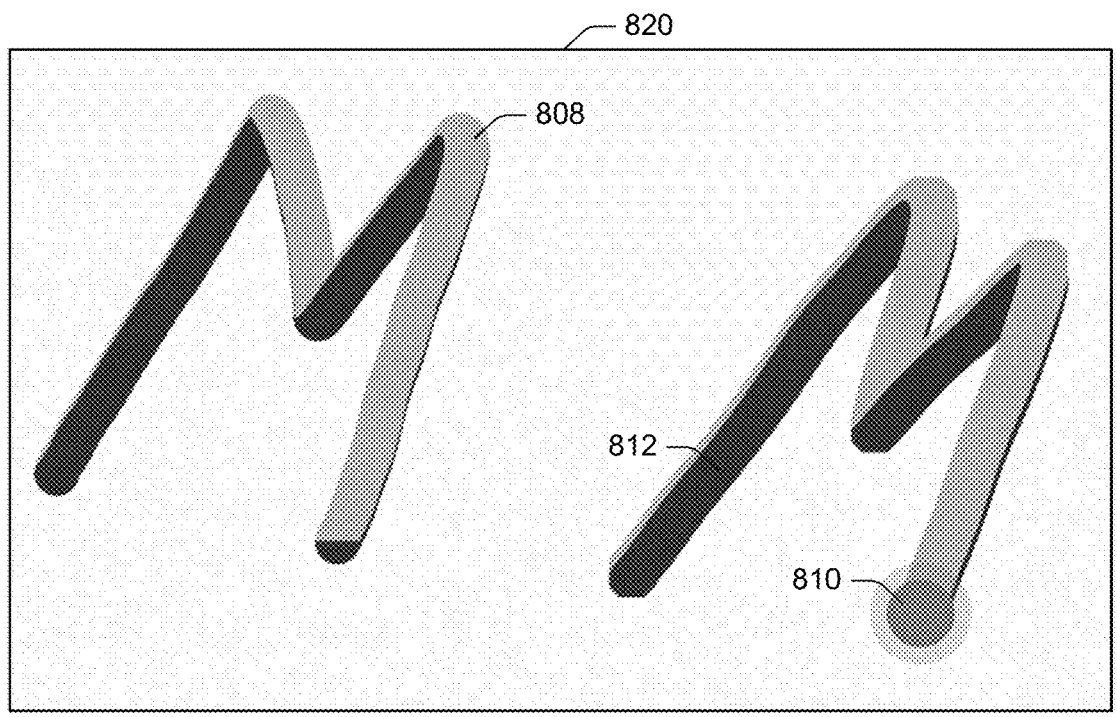

FIGS. 8A, 8B, and 8C illustrate representations of drawing/painting a three-dimensional vector object in substantially real time using a three-dimensional vector-based brush. FIG. 8A illustrates a representation 800 of first strokes drawn or painted digitally. FIG. 8B illustrates a representation 802 of intermediate strokes drawn or painted digitally. FIG. 8C illustrates a representation 804 of a final stroke drawn or painted digitally.

With respect to FIG. 8A, the representation 800 includes a first instance 806 that depicts a raster object 808 drawn or sketched in a user interface. For example, a user interacts with an input device (e.g., a mouse, a touchscreen, a stylus, a keyboard, etc.) and manipulates the input device relative to the user interface to move a cursor 810 in the user interface. In the first instance 806, the user interacts with the input device to draw or paint a vector object 812. In a second instance 814, the user continues to interact with the input device and completes a first stroke of the vector object 812 in the user interface.

The representation 802 includes a third instance 816 in which the user interacts with the input device to manipulate the cursor 810 in the user interface to draw or paint a second stroke of the vector object 812 in the user interface. A fourth instance 818 illustrates a third stroke of the vector object 812 that the user has drawn or painted via interaction with the input device. The representation 804 includes a fifth instance 820 which illustrates a completed vector object 812. As shown, the vector object 812 resembles the raster object 808 visually but the vector object 812 has advantageous properties of a vector object such as being scalable without aliasing and being compactly representable on the storage device 108.

It is to be appreciated that the described three-dimensional vector-based brushes are capable of implementing a variety of functionality such as three-dimensional vector-based brushes having more than four colors, brushes having fill patterns or blend patterns in addition to or in place of the colors, brushes having some colors which cause drawn/painted vector objects to appear shaded or three-dimensional with respect to a light source or multiple light sources. A variety of different shapes of convex geometries of a vector-based brush stamp are contemplated to create a variety of different visual effects and/or appearances. Furthermore, the described three-dimensional vector-based brushes are capable of implementing any brush transformation by adjusting controls and settings of a default brush to match the transformation.

Consider examples of additional functionality implementable using the described three-dimensional vector-based brushes. In a first example, the brush module 110 determines that a particular convex hull representing a particular color of a multi-colored brush is always passed to the planarizer 136 last regardless of a direction between stamps of the multi-colored brush. In this first example, the brush module 110 colors all overlapping regions of convex hulls that include the particular convex hull with the particular color and the brush module 110 colors all overlapping regions of convex hulls that do not include the particular convex hull based on directions between stamps of the multi-colored brush.

In a second example, the brush module 110 determines that a specific convex hull representing a specific color of a multi-colored brush is always passed to the planarizer 136 first regardless of a direction between stamps of the multi-colored brush. In this second example, the brush module 110 never colors overlapping regions of convex hulls that include the specific convex hull with the specific color. For example, the brush module 110 colors overlapping regions of convex hulls that do not include the specific convex hull based on directions between stamps of the multi-colored brush.

In one example, the brush module 110 is capable of specifying an order in which each convex hull representing each color of a multi-colored brush is passed to the planarizer 136 regardless of directions between stamps of the multi-colored brush. The brush module 110 is also capable of specifying an order in which a subset of convex hulls representing a subset of colors of a multi-colored brush is passed to the planarizer 136 regardless of directions between stamps of the multi-colored brush. In some examples, the brush module 110 determines an order for passing convex hulls representing colors of a multi-colored brush to the planarizer 136 based on events or inputs other than directions between stamps of the multi-colored brush such as data received from the input device. In an example in which the input device is a mouse, the brush module 110 determines the order based on a velocity of the cursor 810. In an example in which the input device is a stylus, the brush module 110 determines the order based on a velocity of the stylus, an angle of the stylus, a pressure applied by the stylus, and so forth.

Example System and Device

Figure 9:
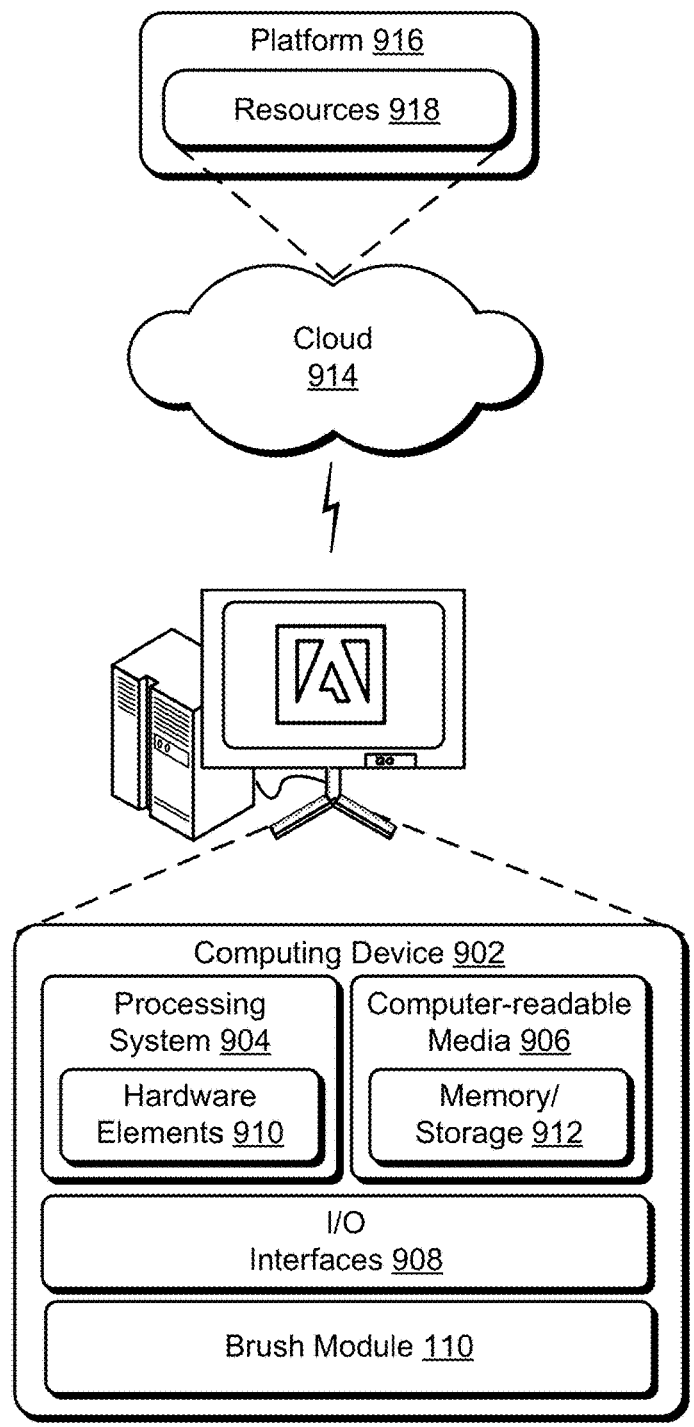
FIG. 9 illustrates an example system that includes an example computing device that is representative of one or more computing systems and/or devices for implementing the various techniques described herein.

FIG. 9 illustrates an example system 900 that includes an example computing device that is representative of one or more computing systems and/or devices that are usable to implement the various techniques described herein. This is illustrated through inclusion of the brush module 110. The computing device 902 includes, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that are configured as processors, functional blocks, and so forth. This includes example implementations in hardware as an application specific integrated circuit or other logic device formed using one or more semiconductors. The hardware elements 910 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 906 is illustrated as including memory/storage 912. The memory/storage 912 represents memory/storage capacity associated with one or more computer-readable media. In one example, the memory/storage 912 includes volatile media (such as random access memory (RAM)) and/or nonvolatile media (such as read only memory (ROM), Flash memory, optical disks, magnetic disks, and so forth). In another example, the memory/storage 912 includes fixed media (e.g., RAM, ROM, a fixed hard drive, and so on) as well as removable media (e.g., Flash memory, a removable hard drive, an optical disc, and so forth). The computer-readable media 906 is configurable in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 902. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 902, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 910. For example, the computing device 902 is configured to implement particular instructions and/or functions corresponding to the software and/or hardware modules. Accordingly, implementation of a module that is executable by the computing device 902 as software is achieved at least partially in hardware, e.g., through use of computer-readable storage media and/or hardware elements 910 of the processing system 904. The instructions and/or functions are executable/operable by one or more articles of manufacture (for example, one or more computing devices 902 and/or processing systems 904) to implement techniques, modules, and examples described herein.

The techniques described herein are supportable by various configurations of the computing device 902 and are not limited to the specific examples of the techniques described herein. This functionality is also implementable entirely or partially through use of a distributed system, such as over a "cloud" 914 as described below.

The cloud 914 includes and/or is representative of a platform 916 for resources 918. The platform 916 abstracts underlying functionality of hardware (e.g., servers) and software resources of the cloud 914. For example, the resources 918 include applications and/or data that are utilized while computer processing is executed on servers that are remote from the computing device 902. In some examples, the resources 918 also include services provided over the Internet and/or through a subscriber network, such as a cellular or Wi-Fi network.

The platform 916 abstracts the resources 918 and functions to connect the computing device 902 with other computing devices. In some examples, the platform 916 also serves to abstract scaling of resources to provide a corresponding level of scale to encountered demand for the resources that are implemented via the platform. Accordingly, in an interconnected device embodiment, implementation of functionality described herein is distributable throughout the system 900. For example, the functionality is implementable in part on the computing device 902 as well as via the platform 916 that abstracts the functionality of the cloud 914.

CONCLUSION

Although implementations of three-dimensional vector-based brushes have been described in language specific to structural features and/or methods, it is to be understood that the appended claims are not necessarily limited to the specific features or methods described. Rather, the specific features and methods are disclosed as example implementations of three-dimensional vector-based brushes, and other equivalent features and methods are intended to be within the scope of the appended claims. Further, various different examples are described and it is to be appreciated that each described example is implementable independently or in connection with one or more other described examples.

What is claimed is:

1. In a digital medium environment, a method implemented by a computing device, the method comprising:
receiving, by the computing device, input data describing first stamp and a second stamp of consecutive stamps of a vector-based digital brush, the first stamp segmented into a first convex geometry and a second convex geometry and the second stamp segmented into a third convex geometry and a fourth convex geometry;
computing, by the computing device, a first convex hull of the first convex geometry and the third convex geometry;
computing, by the computing device, a second convex hull of the second convex geometry and the fourth convex geometry;
determining, by the computing device, an order for passing the first convex hull and the second convex hull to a planarizer; and
generating, by the computing device, a vector-based stroke of digital paint for display in a user interface based on the order.

2. The method as described in claim 1, wherein the order is determined at least partially based on a direction from the first stamp to the second stamp.

3. The method as described in claim 1, wherein the first convex geometry is identical to the third convex geometry.

4. The method as described in claim 1, wherein the second convex geometry is identical to the fourth convex geometry.

5. The method as described in claim 1, wherein the order determines a color of the vector-based stroke of digital paint that corresponds to an overlapping region of the first convex hull and the second convex hull.

6. The method as described in claim 5, wherein the color of the vector-based stroke of digital paint is a color associated with a last one of the first convex hull and the second convex hull passed to the planarizer.

7. The method as described in claim 1, wherein the first convex geometry and the third convex geometry correspond to a first color of the vector-based stroke of digital paint and the second convex geometry and the fourth convex geometry correspond to a second color of the vector-based stroke of digital paint.

8. The method as described in claim 1, further comprising:
receiving additional input data describing a third stamp of the consecutive stamps of the vector-based digital brush, the third stamp segmented into a fifth convex geometry and a sixth convex geometry;
computing a third convex hull of the third convex geometry and the fifth convex geometry; and
computing a fourth convex hull of the fourth convex geometry and the sixth convex geometry.

9. The method as described in claim 8, further comprising generating an additional vector-based stroke of digital paint based on a direction from the second stamp to the third stamp and an overlapping portion of the third convex hull and the fourth convex hull.

10. A system comprising:
a hull module implemented by one or more processing devices to:
receive input data describing a first stamp and a second stamp of consecutive stamps of a vector-based digital brush, the first stamp segmented into first convex geometries and the second stamp segmented into second convex geometries;
compute a first convex hull of a convex geometry of the first convex geometries and a convex geometry of the second convex geometries; and
compute a second convex hull of an additional convex geometry of the first convex geometries and an additional convex geometry of the second convex geometries;
an order module implemented by the one or more processing devices to determine an order for passing the first convex hull and the second convex hull to a planarizer; and
a display module implemented by the one or more processing devices to generate a vector-based stroke of digital paint for display in a user interface based on the order.

11. The system as described in claim 10, wherein the order determines a color of the vector-based stroke of digital paint that corresponds to an overlapping region of the first convex hull and the second convex hull.

12. The system as described in claim 10, wherein the order is determined at least partially based on a direction from the first stamp to the second stamp.

13. The system as described in claim 10, wherein a number of the first convex geometries is equal to a number of the second convex geometries.

14. The system as described in claim 10, wherein each of the first convex geometries corresponds to a different color of the vector-based stroke of digital paint.

15. The system as described in claim 10, wherein the first convex geometries are identical to the second convex geometries.

16. A non-transitory computer-readable storage medium storing instructions, which when executed by a processing device, cause the processing device to perform operations comprising:
receiving input data describing consecutive stamps of a vector-based digital brush;
computing a first convex hull of a convex geometry of a first stamp of the consecutive stamps and a convex geometry of a second stamp of the consecutive stamps;
computing a second convex hull of an additional convex geometry of the first stamp and an additional convex geometry of the second stamp;
determining a relative order for passing the first convex hull and the second convex hull to a planarizer; and
generating a vector-based stroke of digital paint for display in a user interface, the vector-based stroke of digital paint having colors based on the relative order.

17. The non-transitory computer-readable storage medium as described in claim 16, wherein the relative order is determined at least partially based on a timestamp of the first stamp and a timestamp of the second stamp.

18. The non-transitory computer-readable storage medium as described in claim 17, wherein the relative order is determined at least partially based on a direction from the first stamp to the second stamp.

19. The non-transitory computer-readable storage medium as described in claim 16, wherein the colors define a three-dimensional appearance of the vector-based stroke of digital paint.

20. The non-transitory computer-readable storage medium as described in claim 16, wherein the additional convex geometry of the second stamp is different from the convex geometry of the first stamp.

\* \* \* \* \*